US010668577B2

(12) United States Patent
Janes et al.

(10) Patent No.: US 10,668,577 B2
(45) Date of Patent: Jun. 2, 2020

(54) COOLING RING

(71) Applicant: CRC-Evans Pipeline International Inc., Houston, TX (US)

(72) Inventors: Marcus Janes, Tomball, TX (US); Jared Proegler, Houston, TX (US); Brian Kirk, Kingwood, TX (US)

(73) Assignee: CRC-EVANS PIPELINE INTERNATIONAL INC., Houston, TX (US)

(*) Notice: Subject to any disclaimer, the term of this patent is extended or adjusted under 35 U.S.C. 154(b) by 341 days.

(21) Appl. No.: 15/255,103

(22) Filed: Sep. 1, 2016

(65) Prior Publication Data

US 2018/0056456 A1 Mar. 1, 2018

(51) Int. Cl.
*B23K 37/00* (2006.01)
*B23K 31/02* (2006.01)
*B23K 101/10* (2006.01)
*B23K 101/06* (2006.01)

(52) U.S. Cl.
CPC ............ *B23K 37/003* (2013.01); *B23K 31/02* (2013.01); *B23K 2101/06* (2018.08); *B23K 2101/10* (2018.08)

(58) Field of Classification Search
CPC ...... B23K 37/003; B23K 31/02; B23K 37/00; B23K 37/006; B23K 37/06; B23K 2101/06; B23K 2101/10
See application file for complete search history.

(56) References Cited

U.S. PATENT DOCUMENTS

| 3,009,048 A | 11/1961 | Stanley |
| 3,164,712 A | 1/1965 | Paton et al. |
| 3,508,433 A | 4/1970 | Bustin |
| 3,539,915 A | 11/1970 | Walters et al. |
| 3,646,309 A | 2/1972 | Smith, Jr. et al. |
| 3,668,359 A | 6/1972 | Emmerson |
| 3,761,005 A | 9/1973 | Baxter et al. |
| 3,979,041 A | 9/1976 | Kaneyama et al. |
| 4,039,115 A | 8/1977 | Randolph et al. |
| 4,106,555 A * | 8/1978 | Quintal ................... F24T 10/10 165/45 |
| 4,273,985 A | 6/1981 | Paton et al. |
| 4,283,617 A | 8/1981 | Merrick et al. |
| 4,285,460 A | 8/1981 | Clavin |
| 4,380,696 A | 4/1983 | Masaki |
| 4,491,718 A | 1/1985 | Cook et al. |
| 4,531,192 A | 7/1985 | Cook |
| 4,573,666 A | 3/1986 | Nomura et al. |

(Continued)

FOREIGN PATENT DOCUMENTS

| CN | 108015461 A * | 5/2018 |
| GB | 1 386 926 | 3/1975 |

(Continued)

OTHER PUBLICATIONS

CN 108015461 A machine translation.*

(Continued)

*Primary Examiner* — Gordon A Jones
(74) *Attorney, Agent, or Firm* — Pillsbury Winthrop Shaw Pittman LLP

(57) ABSTRACT

A cooling system which achieves temperature control of a heat affected portion of a pipe.

19 Claims, 4 Drawing Sheets

(56) References Cited

U.S. PATENT DOCUMENTS

| | | | |
|---|---|---|---|
| 4,575,611 A | 3/1986 | Bertossa | |
| 4,831,233 A | 5/1989 | Gordon | |
| 4,838,477 A | 6/1989 | Roach et al. | |
| 4,959,523 A | 9/1990 | Fihey et al. | |
| 5,148,000 A | 9/1992 | Tews | |
| 5,165,160 A | 11/1992 | Poncelet | |
| 5,183,099 A * | 2/1993 | Bechu | B60S 1/487 165/169 |
| 5,288,963 A | 2/1994 | Jusionis | |
| 5,343,016 A | 8/1994 | Davis et al. | |
| 5,435,479 A | 7/1995 | Puzey et al. | |
| 5,441,196 A * | 8/1995 | Heinakari | B23K 23/00 228/222 |
| 5,481,085 A | 1/1996 | Kovacevic et al. | |
| 5,685,996 A | 11/1997 | Ricci | |
| 5,706,863 A * | 1/1998 | Matherne | B23K 9/326 138/103 |
| 5,728,992 A | 3/1998 | Swidwa | |
| 5,796,069 A | 8/1998 | Jones et al. | |
| 5,816,479 A | 10/1998 | Matherne et al. | |
| 5,865,430 A | 2/1999 | Conover et al. | |
| 5,925,268 A | 7/1999 | Britnell | |
| 6,044,769 A | 4/2000 | Oka et al. | |
| 6,098,866 A | 8/2000 | Tsuchiya et al. | |
| 6,188,041 B1 | 2/2001 | Kim et al. | |
| 6,230,072 B1 | 5/2001 | Powell et al. | |
| 6,325,277 B1 | 12/2001 | Collie | |
| 6,333,699 B1 | 12/2001 | Zierolf | |
| 6,417,488 B1 | 7/2002 | Takeuchi et al. | |
| 6,605,800 B1 * | 8/2003 | Schick | B23K 9/0956 219/125.1 |
| 6,752,175 B1 | 6/2004 | Willschuetz et al. | |
| 6,759,968 B2 | 7/2004 | Zierolf | |
| 6,840,433 B2 | 1/2005 | Vermaat | |
| 6,850,161 B1 | 2/2005 | Elliott et al. | |
| 6,909,066 B2 | 6/2005 | Zheng et al. | |
| 6,917,176 B2 | 7/2005 | Schempf et al. | |
| 6,924,452 B2 | 8/2005 | Kimura | |
| 7,014,100 B2 | 3/2006 | Zierolf | |
| 7,159,654 B2 | 1/2007 | Ellison et al. | |
| 7,182,025 B2 | 2/2007 | Ghorbel et al. | |
| 7,205,503 B2 | 4/2007 | Reynolds et al. | |
| 7,277,014 B1 | 10/2007 | Waterhouse et al. | |
| 7,474,221 B2 | 1/2009 | Den Boer et al. | |
| 7,484,625 B2 | 2/2009 | Scott et al. | |
| 7,510,218 B2 | 3/2009 | Holdren | |
| 7,540,401 B2 | 6/2009 | Vermaat | |
| 7,661,574 B1 | 2/2010 | McGushion | |
| 7,675,422 B2 | 3/2010 | Stevens et al. | |
| 7,677,439 B2 | 3/2010 | Zierolf | |
| 7,688,210 B2 | 3/2010 | Staff | |
| 7,780,065 B2 | 8/2010 | Vermaat | |
| 7,798,023 B1 | 9/2010 | Hoyt et al. | |
| 7,802,714 B1 | 9/2010 | Kuchuk-Yatsenko et al. | |
| 7,915,561 B2 | 3/2011 | Kossowan | |
| 7,966,860 B2 | 6/2011 | Dijkstra | |
| 8,016,037 B2 | 9/2011 | Bloom et al. | |
| 8,091,775 B2 | 1/2012 | Zierolf | |
| 8,115,138 B2 | 2/2012 | Jacovetty et al. | |
| 8,205,503 B2 | 6/2012 | Cox | |
| 8,313,016 B2 | 11/2012 | Dagenais | |
| 8,328,071 B2 | 12/2012 | Lavalley et al. | |
| 8,353,443 B2 | 1/2013 | Sugiyama et al. | |
| 8,378,841 B2 | 2/2013 | Stevens et al. | |
| 8,389,902 B2 | 3/2013 | McKinley | |
| 8,534,530 B2 | 9/2013 | Biggs | |
| 8,590,769 B2 | 11/2013 | Lavalley et al. | |
| 8,689,836 B2 | 4/2014 | Hudson | |
| 8,695,198 B2 | 4/2014 | Dagenais | |
| 8,714,433 B1 | 5/2014 | Snead et al. | |
| 8,777,201 B2 | 7/2014 | Dagenais | |
| 8,777,482 B2 | 7/2014 | Pfitzner et al. | |
| 8,782,863 B2 | 7/2014 | Pfeiffer | |
| 8,864,012 B2 | 10/2014 | Bonelli | |
| 8,955,733 B2 | 2/2015 | Vanderpol et al. | |
| 8,973,244 B2 | 3/2015 | Lavalley et al. | |
| 9,030,324 B2 | 5/2015 | Christiansen et al. | |
| 9,038,670 B2 | 5/2015 | Vinoy | |
| 9,183,222 B2 | 11/2015 | Gale et al. | |
| 9,304,204 B2 | 4/2016 | Krauhausen et al. | |
| 2007/0023185 A1 | 2/2007 | Hall et al. | |
| 2007/0145129 A1 | 6/2007 | Perkin et al. | |
| 2012/0074631 A1 | 3/2012 | Dagenais | |
| 2012/0126008 A1 | 5/2012 | Binmore | |
| 2012/0213937 A1 | 8/2012 | Lavalley et al. | |
| 2012/0215354 A1 | 8/2012 | Krasny et al. | |
| 2012/0257042 A1 | 10/2012 | McKaigue et al. | |
| 2012/0297652 A1 | 11/2012 | Halvorsen | |
| 2013/0026148 A1 | 1/2013 | Aoyama et al. | |
| 2013/0126503 A1 | 5/2013 | McKinley | |
| 2014/0006227 A1 | 1/2014 | Griggs et al. | |
| 2014/0042207 A1 | 2/2014 | Lavalley et al. | |
| 2014/0091129 A1 | 4/2014 | Peters et al. | |
| 2014/0107947 A1 | 4/2014 | Papadimitriou et al. | |
| 2014/0137389 A1 | 5/2014 | Dagenais | |
| 2014/0191904 A1 | 7/2014 | Illerhaus | |
| 2014/0266009 A1 | 9/2014 | Comello et al. | |
| 2014/0294285 A1 | 10/2014 | Duckworth et al. | |
| 2015/0034629 A1 | 2/2015 | Sherrill et al. | |
| 2015/0108223 A1 | 4/2015 | Weitzhandler | |
| 2015/0114507 A1 | 4/2015 | Warren | |
| 2015/0128639 A1 * | 5/2015 | Burk | F25B 35/04 62/476 |
| 2015/0129557 A1 * | 5/2015 | Miller | B23K 37/003 219/61.7 |
| 2015/0146216 A1 | 5/2015 | Krauhausen et al. | |
| 2015/0226872 A1 | 8/2015 | Doany et al. | |
| 2015/0248569 A1 | 9/2015 | Rushing | |
| 2015/0273636 A1 | 10/2015 | Rajagopalan et al. | |
| 2015/0330551 A1 | 11/2015 | Van Nie et al. | |
| 2016/0032707 A1 | 2/2016 | Bowman | |
| 2016/0032713 A1 | 2/2016 | Hallundbak et al. | |
| 2017/0074554 A1 * | 3/2017 | He | F25B 21/00 |

FOREIGN PATENT DOCUMENTS

| | | |
|---|---|---|
| GB | 2 214 118 A | 8/1989 |
| JP | 2007-205941 | 8/2007 |
| WO | WO 00/41843 | 7/2000 |
| WO | WO 2011/012998 A1 | 2/2011 |

OTHER PUBLICATIONS

"Explorer II—Wireless Self-powered Visual and NDE Robotic Inspection System for Live Gas Pipelines", National Energy Technology Laboratory, DE-FC26-04NT42264, downloaded from URL: http://www.netl.doe.gov/research/oil-and-gas/project-summaries/completed-td/de-fc26-04nt42264 (4 pages).

"Final Report: Explorer-II: Wireless Self-powered Visual and NDE Robotic Inspection System for Live Gas Distribution Mains", Oil & Natrural Gas Technology,DE-FC26-04NT-42264, downloaded from URL: https://www.netl.doe.gov/File%20Library/Research/Oil-Gas/NT42264_FinalReport.pdf (120 pages).

* cited by examiner

COOLING RING

CROSS-REFERENCE TO RELATED APPLICATIONS

This application incorporates by reference in its entirety the content of International Application No. PCT/US2015/062558, filed Nov. 25, 2015.

FIELD OF THE INVENTION

The present patent application relates to heat exchanger systems and methods used for welding.

BACKGROUND OF THE INVENTION

Some materials for pipeline welding have maximum temperature limits which should not be exceeded in order to achieve desired material properties in the welded joint and the heat affected zone (HAZ) of the pipe adjacent to the weld. Current welding systems fail to prevent overheating of the HAZ and regularly allow maximum temperature limits to be exceeded.

The heat from the welding process often overheats the pipe being welded to a temperature above the maximum temperature limit for the pipe. Such overheating can lead to weld failure, pipe failure, or can cause welding to be stopped until the pipe cools to a temperature less than the maximum temperature limit sufficient to allow welding to resume. In other cases, welds and pipes and/or pipe segments which are noncompliant to specifications as a result of failure to control the temperature of the HAZ during welding have to be removed and the pipes re-welded.

SUMMARY OF THE INVENTION

In an embodiment, a heat exchanger for a pipe can have a first heat transfer material adapted for contact with a portion of a pipe and adapted to transfer heat from the pipe to a cooling medium. The first heat transfer material can be formed to have one or more passages through which the cooling medium can flow. The first heat transfer material can be formed and/or configured radially about at least a portion of the pipe and can be adapted to have a heat transfer rate sufficient to cool a portion of a pipe in a heat affected zone adjacent to a weld to maintain a temperature less than a maximum temperature limit.

In an embodiment, the heat exchanger can have a first heat transfer material which has copper, or is copper. In another embodiment, the heat exchanger can have a first heat transfer material which is a copper tube. In yet another embodiment, the heat exchanger can have a first heat transfer material configured in the form of a coil around at least a portion of the pipe.

Optionally, the heat exchanger can be a single-use heat exchanger which is destroyed to achieve its removal from around at least a portion of the pipe. The single-use heat exchanger can have a sacrificial cooling coil which can be destroyed to achieve its removal from around at least a portion of the pipe. In an embodiment, the sacrificial cooling coil is a copper cooling coil which is destroyed to achieve its removal from around at least a portion of the pipe.

Optionally, the heat exchanger can be a multiple-use heat exchanger. The multiple-use heat exchanger can have two or more curved sections. Optionally, the two or more curved sections can be connected by a hinge or other means to allow the curved sections to be placed adjacent to an inner or outer circumference of a pipe and can be clamped, or otherwise held in place.

Either of the single-use or multiple-use heat exchanger embodiments can optionally have a second heat transfer material between the pipe and the first heat transfer material. The second heat transfer material can have a silicone comprising a metal, such as copper.

In an embodiment, a method of cooling a pipe can have the steps of: providing a first heat exchange material; providing a cooling medium; contacting the first heat exchange material with a heat affected zone of a pipe; using the first heat exchange material to transfer heat from the heat affected zone of a pipe to a cooling medium; and maintaining the temperature of the heat affected zone of a pipe less a maximum value.

In an embodiment, the method of cooling a pipe using a heat exchanger, such as a cooling ring, can maintain the temperature of the heat affected zone of a pipe to a value of 500° C. or lower (herein "lower" and "less" are used synonymously regarding temperature ranges), or 300° C. or lower, or 200° C. or lower, or 150° C. or lower, or 100° C. or lower, or 75° C. or lower, or 50° C. or lower, or 25° C. or lower, or 15° C. or lower.

In an embodiment, the method of cooling a pipe can further have the steps of providing a first heat exchange material formed as a copper coil, and configuring the copper coil radially about at least a portion of the pipe.

In an embodiment, the method of cooling a pipe can further have the steps of providing a first heat exchange material formed to have a passage through which all or part of the cooling medium flows, and destroying the passage when removing the heat exchange material from the pipe.

In an embodiment, a cooling system for a pipe can have a cooling ring through which a cooling medium passes. The cooling ring can be radially configured about at least a portion of a pipe. A cooling means can be used for cooling the cooling medium and the cooling ring can be adapted to have a heat transfer rate sufficient to cool a portion of a pipe in a heat affected zone adjacent to a weld to maintain a pipe temperature which is equal to or less than a maximum temperature limit.

Optionally, the cooling system can use a contact member to contact the pipe and reduce air spaces to increase heat transfer to the cooling ring. In an embodiment, the contact member can have a metal, such as copper. For example, the contact member can be a silicone material impregnated with a metal, such as copper. In an embodiment, the cooling system can use a contact member and/or filling material and/or heat transfer material to contact the pipe and to occupy space between the pipe and a heat transfer material of the cooling ring which can increase heat transfer from the pipe to the cooling ring.

BRIEF DESCRIPTION OF THE DRAWINGS

The present invention in its several aspects and embodiments solves the problems discussed above and significantly advances the technology of welding. The present invention can become more fully understood from the detailed description and the accompanying drawings, wherein.

Herein, like reference numbers in one figure refer to like reference numbers in another figure.

DETAILED DESCRIPTION OF THE INVENTION

The varied and several embodiments disclosed herein use a heat exchanger to solve a difficult problem faced in the welding environment and achieve temperature control at and near a pipeline weld location and/or at one or more of a heat affected zone (HAZ) of a pipe which is proximate to the weld and/or weld location. Some corrosion resistant alloy materials (CRAs) for pipeline welding have a maximum temperature limit, or other temperature limit and/or specified temperature limit, which should not be exceeded. Welding specifications, desired weld properties, and desired material properties in the welded joint and the heat affected zone adjacent to the weld can be achieved by using the equipment, methods and processes disclosed herein. For example, one or more of a cooling ring (also herein synonymous with "pipe ring") can be used to maintain a weld location and/or HAZ at or lower than a maximum temperature limits, or other temperature limit, which should not be exceeded. In one embodiment, for Nickel-based CRAs, the temperature limit can be 100° C. and the use of one or more cooling rings can keep the temperature of the weld location and/or HAZ at a temperature of 100° C. or lower. In another embodiment, for Iron-based CRAs, the temperature limit can be 150° C. and the use of one or more cooling rings can keep the temperature of the weld location and/or HAZ at a temperature of 150° C. or lower.

The embodiments disclosed herein can prevent the heat from the welding process from overheating the pipe, weld location and/or HAZ above the maximum temperature limit, or other desired temperature limitation.

Numeric values and ranges herein, unless otherwise stated, also are intended to have associated with them a tolerance and to account for variances of design and manufacturing. Thus, a number can include values "about" that number. For example, a value X is also intended to be understood as "about X". Likewise, a range of Y-Z, is also intended to be understood as within a range of from "about Y-about Z". Unless otherwise stated, significant digits disclosed for a number are not intended to make the number an exact limiting value. Variance and tolerance is inherent in mechanical design and the numbers disclosed herein are intended to be construed to allow for such factors (in non-limiting e.g., ±10 percent of a given value). Likewise, the claims are to be broadly construed in their recitations of numbers and ranges.

Figure 1:
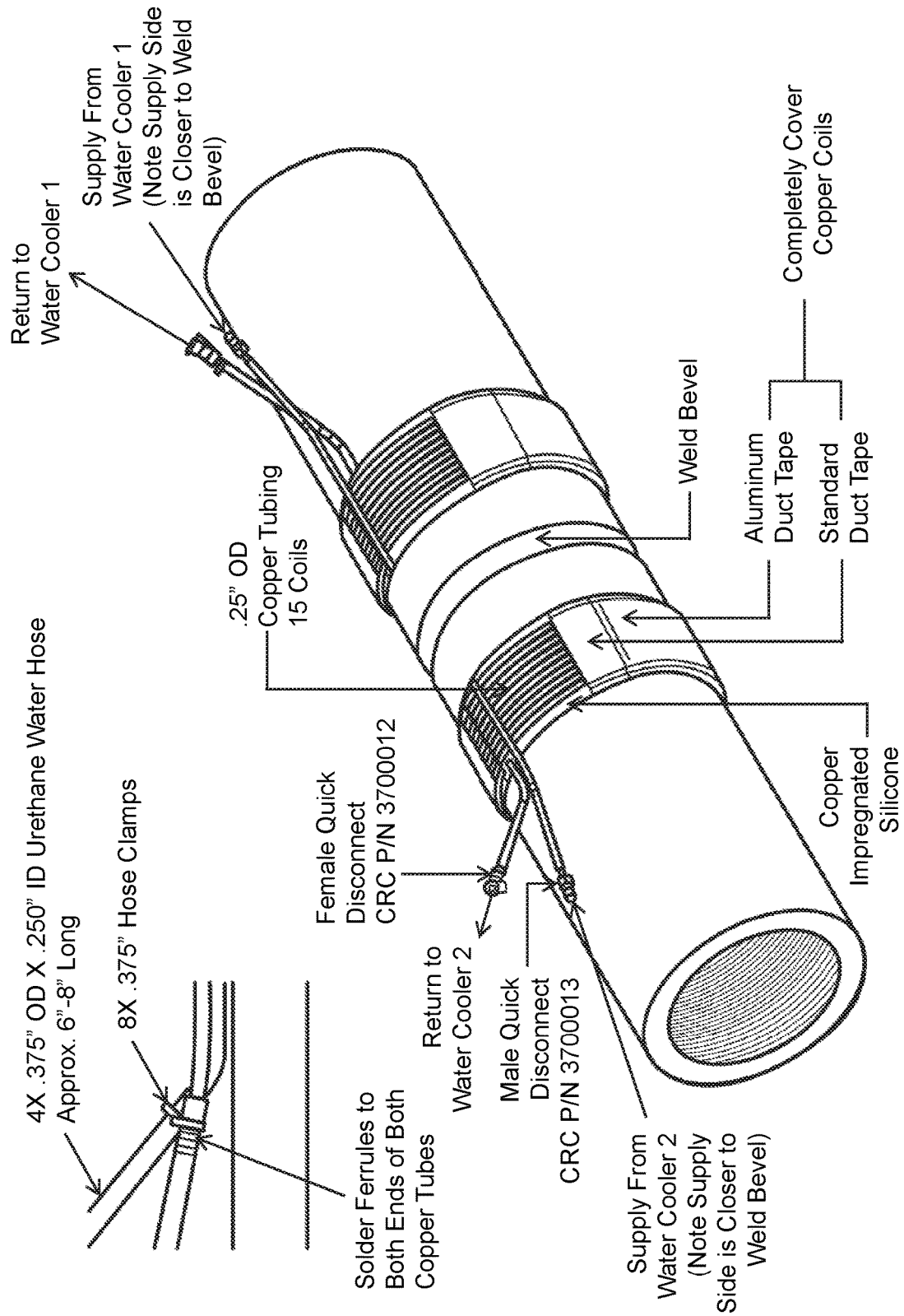
FIG. 1 shows a detail of embodiment of a number of cooling rings adjacent to a pipe weld.

FIG. 1 shows a detail of embodiment of a plurality of cooling rings adjacent to a pipe weld. FIG. 1 shows a first pipe and a second pipe having a weld bevel between them. In the embodiment of FIG. 1, the first pipe has a first cooling ring and the second pipe has a second cooling ring. The first cooling ring and the second cooling ring can each have a location proximate to the weld bevel and can each optionally be located in the HAZ.

Each of the cooling rings shown in FIG. 1 can be a copper tube which has a plurality of coils coiled around at least a portion of the outside of the pipe. Optionally, a copper impregnated silicone material and/or sheet can be located between an outer surface of a pipe and a portion of the plurality of coils. In an embodiment, the copper impregnated silicone material is thermally conductive and can transfer heat from the pipe to the plurality of coils.

Optionally, a plurality of coils can be secured in position by a tape, such as a standard duct tape, or an aluminum duct tape. In an embodiment, the tape is used to cover the outer coil surface in part or completely of one or a plurality of the copper coils. In an embodiment, the tape can be used to secure one or a plurality of the copper coils to the copper impregnated silicone material.

In an embodiment, each cooling ring can have a coil inlet which received a cooling medium from a cooling medium supply, such as a cooling water from a cooling water supply. The cooling medium, such as cooling water, can be fed by a feed line to a coil inlet. Optionally, the feed line can be connected to the coil inlet by a quick disconnect fitting, such as a male quick disconnect. The cooling water can flow through the cooling coil and discharge through a quick disconnect, such as a female quick disconnect, out through a return line which can optionally return to a water cooler. In an embodiment, the cooling water is designed as a recycle and/or recirculation which feeds cooling water from and returns cooling water to the same water cooler or water cooling system.

In an embodiment, all or part of the feed line and return line, as well as a coil feed portion and coil exit portion can be made of a polymer hose, such as urethane water hose. In an embodiment the copper coil can have soldered ferrules at the inlet of the coil feed portion and outlet of the coil exit portion which can allow respective feed hose portions and return hose portions to be sealed adjacent to optional hose clamps.

In the example of FIG. 1, the first cooling ring is supplied from a first water cooler, and the second cooling ring is supplied from a second water cooler.

Figure 2:
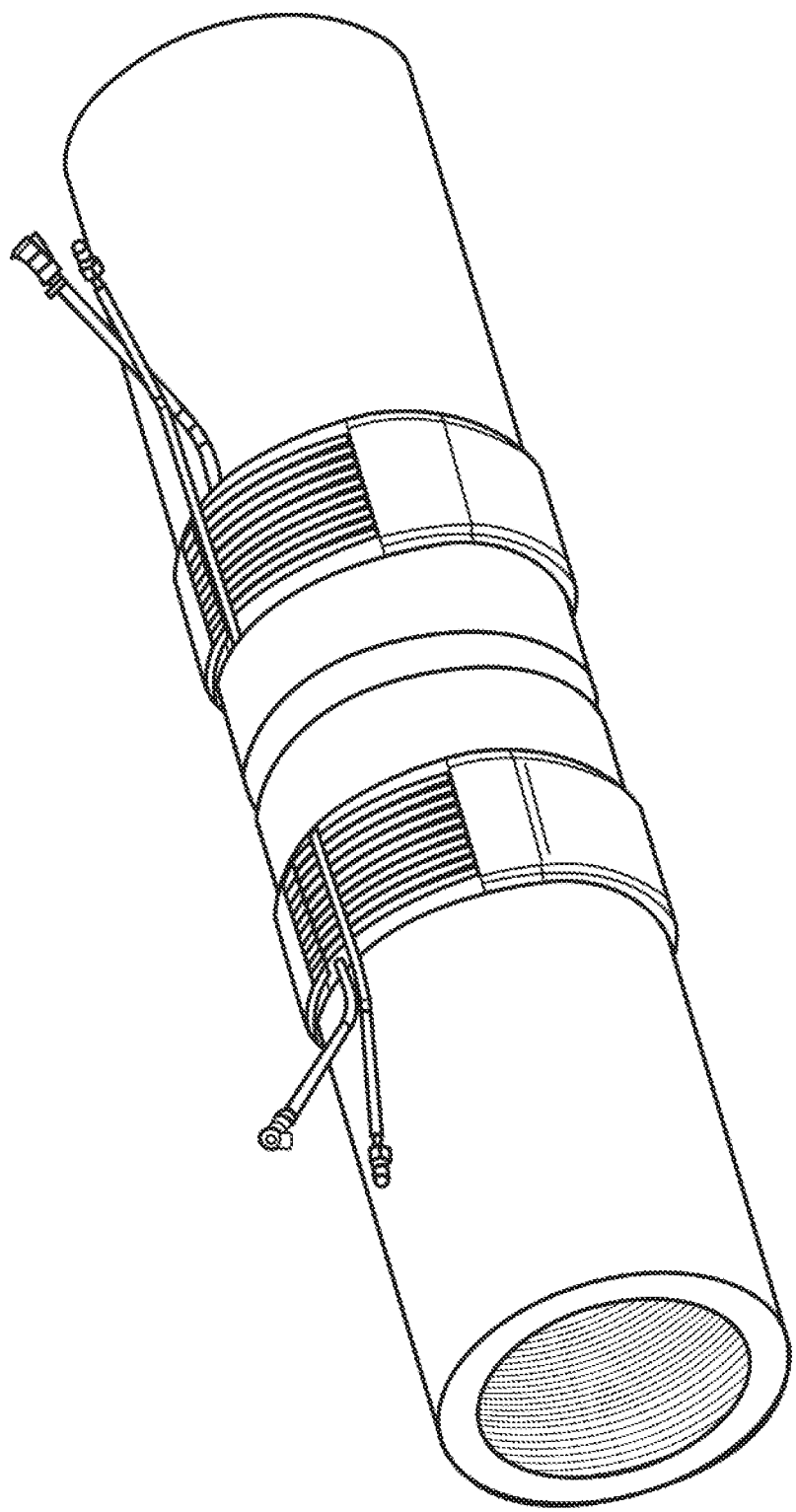
FIG. 2 shows a general image of a number of cooling rings adjacent to a pipe weld.

FIG. 2 shows a general image of the first cooling ring around a portion of a first pipe adjacent to a pipe weld bevel, and a second cooling ring around a portion of a second pipe adjacent to the weld bevel.

Figure 4:
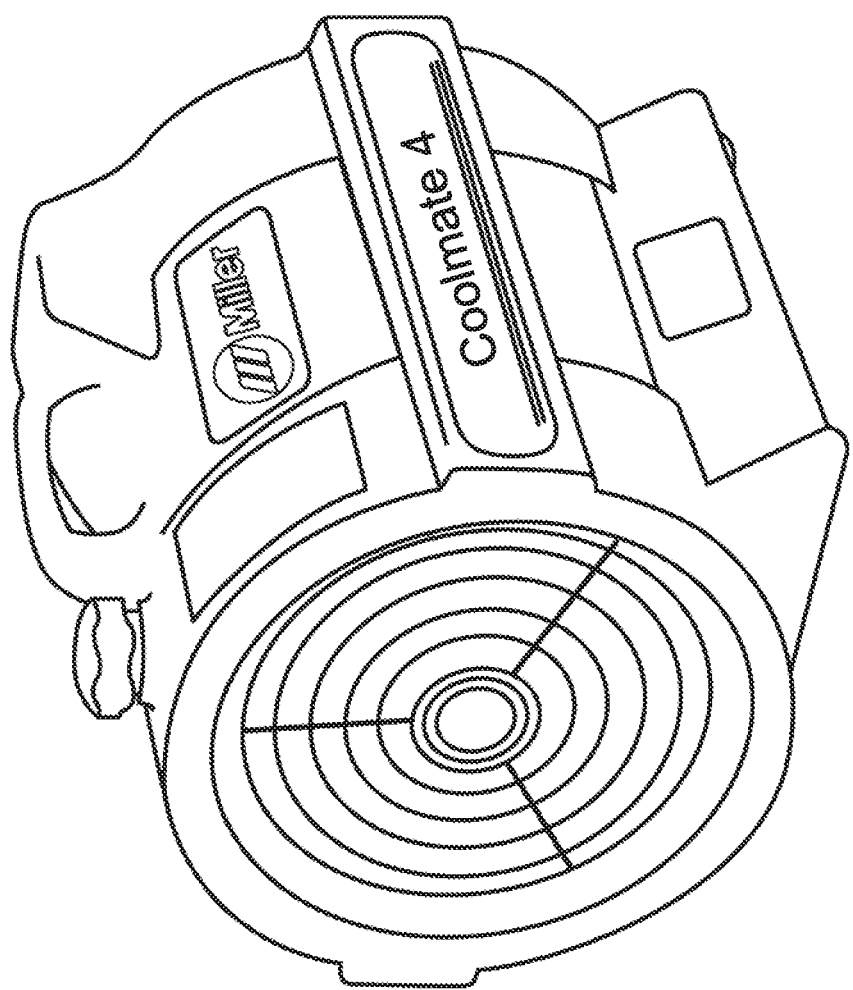
FIG. 4 shows an example of a cooling unit.

In an embodiment, one cooling ring can be located on each side of the weld and/or weld bevel, with each cooling ring around a portion of its respective pipe. Each cooling ring can be connected to its own cooling supply and/or cooling system and/or cooling unit, such as a Coolmate (FIG. 4).

FIG. 2 shows a CAD model of two cooling rings installed around two portions of pipes on either side of a weld and/or weld bevel.

In an embodiment, a cooling ring can be single-use, or sacrificial, in that after use the coil is cut allowing the cut pieces to be removed from or fall off of the pipe around which it is wrapped. Cutting one of a turn of the coil, or cutting a plurality of the turns of the coil, allows the cooing ring to be removed from and/or the coil cut pieces to fall from the pipe bearing the cooling ring. When the cooling ring is removed from the pipe, or the coil is cut, the pipe is free of the cooling ring and its pieces and parts.

Optionally, the cooling ring can be reusable. In a first embodiment, a reusable cooling ring can have half rings that can be clamped around the pipe and connected to form a cooling ring around at least a portion of a pipe circumference and encompassing at least a portion of the pipe. The half rings can either be separate parts or connected, for nonlimiting example by a hinge. Optionally, the half ring can have a permanent layer of conductive silicone attached to its inner surface.

In another example of a reusable cooling ring, a portion, or all, of the cooling ring can be made out of a polymer which can be formed to have channels for coolant flow. In an embodiment, the entire cooling ring can be made of conductive silicone having channels for coolant flow.

In another embodiment, the cooling ring can be made of polymer and can have channels. It can have one or more hollow channels running from one end and/or point to another along a length. For example, the cooling ring can have a cooling strip which can have a cap which can connect the channels to the inlet and outlet hoses which can circulate cooling fluid through the cooling ring and the cooling system. In an embodiment, the strip can be held in position to cool a pipe by a securing means, such as a tape, or one or more nylon straps, or any other device capable of producing a small amount of force and/or tension to position the cooling ring adjacent to a pipe to be cooled and allow for heat transfer from the pipe through the cooling ring.

In yet another embodiment, a one or more of a reusable cooling ring and/or cooling strip can have channels for the flow of a cooling medium. The cooling ring(s) and/or cooling strip(s) can be positioned on the pipe-facing side of a welding band upon which a welding machine can move during the welding of a pipe.

In an embodiment, one or more of a cooling ring can be located inside of a pipe and/or pipe portion to be cooled.

Cooling flow rate can be controlled and/or turned on or off by turning a coolant pump, such as a cooling water pump on or off, or by other flow control means.

Figure 3:
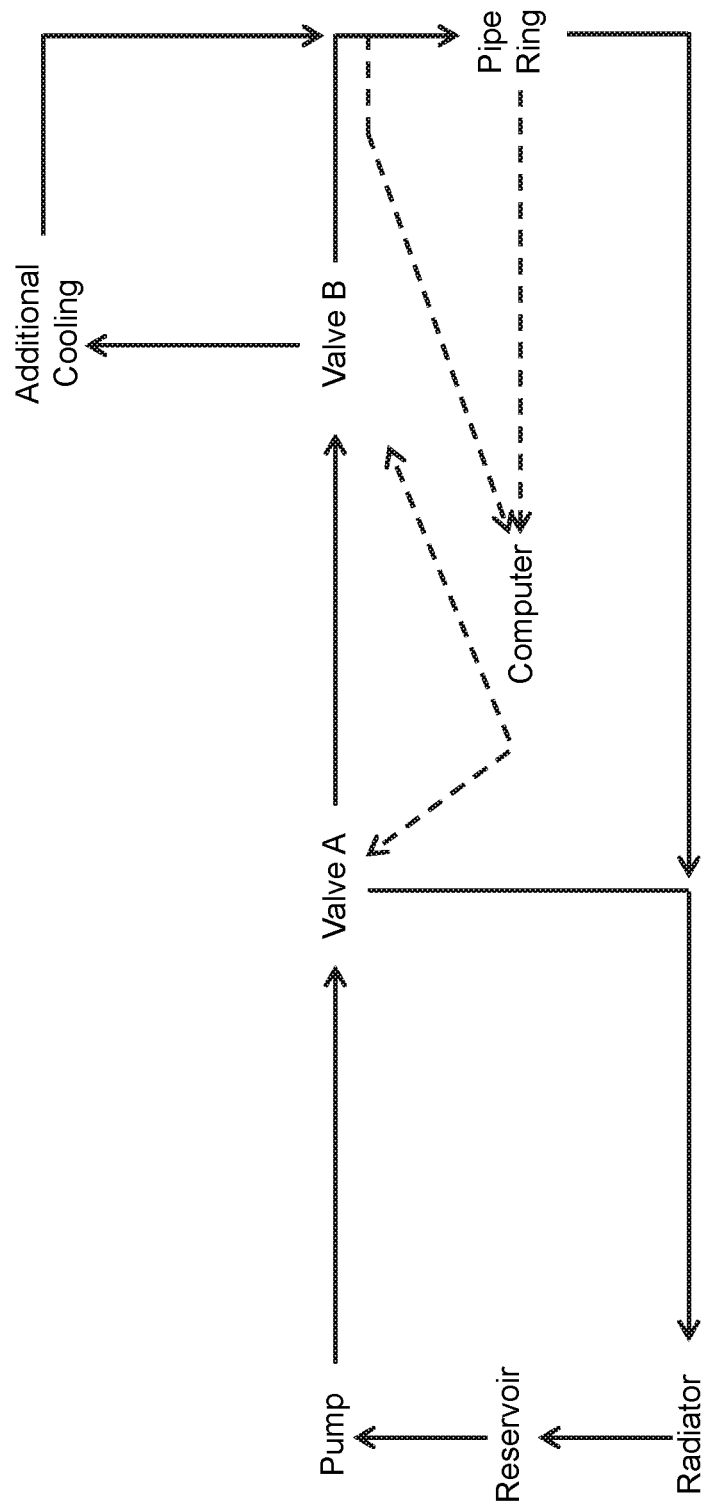
FIG. 3 shows a process diagram for an operating embodiment of a cooling ring (also herein as "pipe ring")

FIG. 3 shows a process diagram for an operating embodiment of a cooling ring (also herein as "pipe ring"). As shown in the embodiments of FIGS. 1 and 2, a first cooling ring can be located in the HAZ of the first pipe and a second cooling ring can be located in the HAZ of a second pipe, which positions the first cooling ring and second cooling ring on either side of the welded joint and/or weld bevel and/or weld.

The example embodiment of FIG. 3 is a cooling system which can be used to control the temperature of a pipe and/or its HAZ adjacent to the weld joint. The cooling system can be used to lower the temperature of the pipe and/or its HAZ and avoid poor quality welds, pipe damage, weld failure and/or interruptions to the welding process to allow for pipe cooling.

The cooling system shown in FIG. 3 corresponds to one cooling ring or pipe ring. However, multiple cooling rings or pipe rings can be used respectively in conjunction with as many cooling systems of the type shown in FIG. 3 as desired. The embodiments of FIGS. 1 and 2, use two cooling rings each which can be used with a cooling system of the type of FIG. 3.

The example cooling system shown in FIG. 3 can have reservoir for a cooling medium, such as water, which is pumped from the reservoir by a pump, such as a cooling medium feed pump. The cooling medium feed pump can pump the cooling medium through first valve, such as valve A to the cooling ring (pipe ring), or optionally valve can be used to recycle all or part of the cooling medium through a radiator back to the reservoir. As another optional feature, a second valve, e.g. valve B, can be used to direct all or part of the cooling medium flow from the first valve, e.g. valve A, for additional cooling before reaching the cooling ring (pipe ring). The effluent from the cooling ring (pipe ring) can be fed to the radiator and then to the reservoir.

In an embodiment, the first valve, valve A, and the second valve, valve B, can be computer actuated valves. The flow of cooling medium, flow of optional recycle and flow of optional additional cooling can all be regulated and controlled by a computer to maintain a desired feed temperature to the cooling ring (pipe ring). In another embodiment, the flow of cooling medium, flow of optional recycle and flow of optional additional cooling can all be regulated and controlled by a computer to achieve a desired temperature at a portion of a pipe, or to achieve a temperature of the cooling medium as it exits the cooling ring (pipe ring).

In an embodiment, the reservoir can hold a supply of a cooling fluid (also herein as "cooling medium"). The cooling fluid (cooling medium) can be in nonlimiting example, one or more of: water, anti-freeze (e.g. ethylene glycol), or any other suitable fluid based on operating conditions.

The valves, such as valve A and valve B, of the system of FIG. 3 can be manual, computer controlled and/or actuated and can also be proportional or on/off valves. These valves, whether manual or computer controlled, can be used to control how much cooling fluid reaches the cooling ring (pipe ring), as well as to control the temperature of the pipe segments being welded and of the cooling ring (pipe ring) or other equipment of the cooling system, such as the radiator and/or reservoir.

In an embodiment, the computer can receive input which can be a temperature of a pipe and/or a cooling fluid (cooling medium) and using program executable logic can adjust the first valve, e.g. valve A, and the second valve, e.g. valve B, to maintain temperature of pipe within specified range.

In an embodiment, a controller can be used to adjust one or more of the system valves, e.g. valve A and/or valve B. Optionally, the controller can be capable of reading multiple temperature sensors and sending control signals to one, two or more valves. Optionally, the controller would monitor the temperature of the pipe at or near the cooling ring and optionally measure the temperature of the cooling fluid at one or more locations. The controller would then execute computer executable logic to determine whether to open or close the valves based on the temperature readings.

In an embodiment, the pipe temperature sensor(s) can be either a thermocouple in direct contact with the pipe or an infrared sensor that measures temperature without contact. The cooling fluid temperature sensor can be an off-the-shelf sensor for measuring the temperature of a flowing fluid, or custom-designed sensor. In an embodiment, the controller may obtain sensor information (e.g., temperature or other sensors) from one or more sensors, and transmit the sensor information to one or more remote computer systems (e.g., a remote mobile device, a remote computer system, etc., for monitoring, analyzing, and/or controlling one or more operations of the heat exchanger described herein).

In an embodiment, a remote computer system may cause one or more operations of a heat exchanger system described herein to be effectuated based on the sensor information. In an embodiment, the remote computer system may transmit one or more commands, parameters, or other information to the controller or other component of the heat exchanger system to adjust one or more of the system valves (e.g., by opening or closing partially or completely valve A and/or valve B of FIG. 3 or other system valves based on sensor information indicating temperature readings). As an example, responsive to the sensor information indicating a temperature exceeding a certain temperature threshold (e.g., too hot), the remote computer system may automatically transmit a command or parameter to the heat exchanger system, which causes the heat exchanger system to open one or more system valves (e.g., further opening a valve that is already partially open, opening partially or completely a valve that was closed, etc., to allow more fluids to flow to further heat exchange). As another example, responsive to the sensor information indicating a temperature falling below a certain temperature threshold (e.g., too cold), the remote computer system may automatically transmit a command or parameter to the heat exchanger system, which causes the heat exchanger system to close one or more system valves (e.g., closing a valve partially, closing a valve completely, etc., to decrease fluid flow to limit heat exchange).

In an embodiment, the first valve, e.g. valve A, can be a recirculation valve. This valve can be controlled manually or electronically. The valve would allow some, or all, of the cooling fluid coming from the pump to by-pass the pipe ring and reduce the level of cooling. This can be a first level of cooling control.

In an embodiment, the radiator can provide cooling to the cooling fluid (cooling medium) and can be a radiator, water bath, water/ice bath, salt water/ice bath, dry ice chamber, powered refrigeration device (i.e. refrigerator/freezer) or other method of removing heat from the cooling fluid.

In an embodiment, optional additional cooling can be used. This can be a second level of cooling control. The additional cooling can recycle back to the radiator and/or can be fed to a unit operation, such as a radiator or a cooling unit, which can cool the additional cooling stream from valve B. Optionally, the additional cooling can be provided by a radiator, water bath, water/ice bath, salt water/ice bath, dry ice chamber, powered refrigeration device (i.e., refrigerator, or freezer, or cooling unit), or other method of removing heat from the cooling fluid.

This optional cooling circuit for additional cooling can be controlled by the second valve, e.g. valve B. Some welding procedures can impart excessive heat into a pipe, at greater rates than other procedures. If more heat is going into the pipe than the standard radiator can remove, then this additional cooling circuit can prevent the pipe temperature from exceeding the maximum temperature limit.

In an embodiment, the cooling ring (pipe ring) can have a copper tubing that has been wound around the pipe and which is for a single-use, which is after that use removed or cut off of the pipe portion around which it was wound.

In another embodiment, the cooling ring (pipe ring) is adapted for multiple-uses. As an example of a multiple-use embodiment, the cooling ring (pipe ring) can have two (2) or more curved sections that can be assembled around the pipe, used to cool the pipe, then removed, and reused on the same or a different pipe.

In an embodiment, the cooling ring (pipe ring) can have a portion in direct contact with the pipe, such as the copper coil having at least a portion which is in direct contact with the pipe. In another embodiment, a heat transfer material can be positioned between the pipe and the cooling ring (pipe ring), such as a pad of thermally conductive material which can eliminate air gaps and improve heat transfer.

In an embodiment, the cooling ring (pipe ring) is a heat exchange device which removes heat from a portion of a pipe, a pipe and/or a HAZ of a pipe.

FIG. 4 shows an example of a cooling unit. In an embodiment, the cooling system can have a radiator. In another embodiment, it can have a radiator, reservoir, pump, and pipe ring. In yet another embodiment, it can have a radiator, reservoir and pump which are all in an integrated unit, such as a Coolmate 4 from Miller Electric Manufacturing Company (1635 West Spencer Street. P.O. Box 1079. Appleton, Wis. 54912-1079 USA, Phone: 866-931-9730). This disclosure does not limit the type of cooling system which can be used to cool the feed of cooling medium to the cooling ring.

EXAMPLE 1

In an example, a cooling ring was made of a copper tubing wrapped around a pipe by hand to form a coil having an inner coil surface and an outer coil surface. A thin copper-filled silicone sheet was placed between the tubing and pipe to eliminate the air gap between the inner coil surface and the pipe. The coil and thin copper-filled silicone sheet assembly was wrapped in tape which held the coil firmly against the thin copper-filled silicone sheet. The wrapping also held the coil and thin copper-filled silicone sheet assembly firmly against the pipe portion being cooled. Water was run through the coil and the cooling ring cooled the pipe portion, i.e. HAZ, satisfactorily during welding.

This scope disclosure is to be broadly construed. It is intended that this disclosure disclose equivalents, means, systems and methods to achieve the devices, activities and mechanical actions disclosed herein. For each process, method, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a cooling ring and cooling system and its many aspects, features and elements. Such a devices and methods can be dynamic in its use an operation, this disclosure is intended to encompass the equivalents, means, systems and methods of the use of the tool and its many aspects consistent with the description and spirit of the operations and functions disclosed herein. The claims of this application are likewise to be broadly construed.

The description of the inventions herein in their many embodiments is merely exemplary in nature and, thus, variations that do not depart from the gist of the invention are intended to be within the scope of the invention. Such variations are not to be regarded as a departure from the spirit and scope of the invention.

We claim:

1. A system comprising:
   a first metal pipe;
   a second metal pipe;
   a weld joint connecting the first pipe and the second pipe;
   a first heat transfer structure adapted for contact with at least a portion of the first pipe and/or the second pipe and adapted to transfer heat from the first pipe and/or the second pipe to a cooling medium;
   said first heat transfer structure comprising a plurality of coils coiled circumferentially around at least the portion of the first pipe and/or the second pipe, each of the plurality of coils having a cooling passage through which the cooling medium flows circumferentially around at least the portion of the first pipe and/or the second pipe to transfer the heat from the first pipe and/or the second pipe to the cooling medium; and
   said first heat transfer structure adapted to have a heat transfer rate sufficient to cool at least the portion of the first pipe and/or the second pipe in a heat affected zone adjacent to the weld joint to maintain a temperature of at least the portion of the first pipe and/or the second pipe below a maximum temperature limit.

2. The heat exchanger according to claim 1, wherein the first heat transfer structure comprises copper.

3. The heat exchanger according to claim 1, wherein the temperature includes a temperature of the first pipe and/or the second pipe at the weld joint and a temperature of the first pipe and/or the second pipe in the heat affected zone, wherein the maximum temperature limit includes a maximum temperature limit of the first pipe and/or the second pipe at the weld joint and a maximum temperature limit of the first pipe and/or the second pipe in the heat affected zone, and wherein the first heat transfer structure is configured to maintain the temperature of the first pipe and/or the second pipe at the weld joint below the maximum temperature limit of the first pipe and/or the second pipe at the weld joint and to maintain the temperature of the first pipe and/or the second pipe in the heat affected zone below the maximum temperature limit of the first pipe and/or the second pipe in the heat affected zone.

4. The heat exchanger according to claim 1, wherein the first heat transfer structure is configured to be disposed in the heat affected zone and/or in a location proximate to the weld joint.

5. The heat exchanger according to claim 1, wherein the first heat transfer structure is configured as a single-use heat exchanger.

6. The heat exchanger according to claim 1, wherein the first heat transfer structure is configured as a single-use heat exchanger, and
   wherein at least one of the plurality of coils comprising a sacrificial cooling coil.

7. The heat exchanger according to claim 2, wherein the first heat transfer structure is configured as a single-use heat exchanger, and
   wherein at least one of the plurality of coils comprising a sacrificial copper cooling coil.

8. The heat exchanger according to claim 1, wherein the first heat transfer structure is a multiple-use heat exchanger.

9. The heat exchanger according to claim 1, wherein the first heat transfer structure is a multiple-use heat exchanger further comprising two or more curved sections.

10. The heat exchanger according to claim 1, further comprising a second heat transfer structure between an outer surface of the first pipe and/or the second pipe and said first heat transfer structure.

11. The heat exchanger according to claim 10, wherein the second heat transfer structure comprises a silicone material comprising a metal.

12. The heat exchanger according to claim 10, wherein the second heat transfer structure comprises a silicone material comprising copper.

13. A system comprising:
    a first metal pipe;
    a second metal pipe;
    a weld joint connecting the first pipe and the second pipe;
    a cooling ring through which a cooling medium flows;
    said cooling ring comprising a plurality of coils coiled circumferentially around at least a portion of the first pipe and/or the second pipe, each of the plurality of coils is configured to facilitate a flow of the cooling medium therethrough to transfer heat from the first pipe and/or the second pipe to the cooling medium;
    a cooling means for cooling said cooling medium;
    said cooling ring adapted to have a heat transfer rate sufficient to cool at least the portion of the first pipe and/or the second pipe in a heat affected zone adjacent to the weld joint to maintain a temperature of at least the portion of the first pipe and/or the second pipe below a maximum temperature limit.

14. The cooling system according to claim 13, further comprising a contact member to contact the first pipe and/or the second pipe, said contact member occupying a space between the first pipe and/or the second pipe and a heat transfer material of the cooling ring.

15. The cooling system according to claim 14, wherein the contact member comprises a metal.

16. The cooling system according to claim 14, wherein the contact member comprises copper.

17. The cooling system according to claim 14, wherein the contact member comprises a silicone material comprising a metal.

18. The cooling system according to claim 14, wherein the contact member comprises a silicone material comprising copper.

19. The cooling system according to claim 14, wherein the contact member includes a copper impregnated silicone material.

* * * * *